United States Patent [19]
Schinnerer et al.

[11] 3,740,163
[45] June 19, 1973

[54] FLUID BEARING INERTIAL FILTER

[75] Inventors: Roy L. Schinnerer, Long Beach;
Alexander Silver, Tarzana; Leonard T. Sladek; Morris A. Barnett, both of Palos Verdes Estates, all of Calif.

[73] Assignee: The Garrett Corporation, Los Angeles, Calif.

[22] Filed: Feb. 25, 1971

[21] Appl. No.: 118,741

[52] U.S. Cl. ...... 415/111, 308/DIG. 1, 55/DIG. 14, 417/407, 415/121 G
[51] Int. Cl. ........................ F04d 29/04, F04b 17/00
[58] Field of Search ............... 277/53, 66; 415/111, 415/112, 113, 170, 110; 417/407; 55/17, DIG. 14; 308/9, DIG. 1

[56] References Cited
UNITED STATES PATENTS
3,038,318 6/1962 Hanny ............................. 417/407
3,182,897 5/1965 Trumpler ........................... 308/9
2,469,846 5/1949 Roth et al. ........................ 415/112

FOREIGN PATENTS OR APPLICATIONS
358,394 9/1922 Germany ............................ 55/17

Primary Examiner—Henry F. Raduazo
Attorney—Albert J. Miller and John M. Hazelwood

[57] ABSTRACT

An inertial filter to provide fluid for turbomachine fluid bearings.

10 Claims, 6 Drawing Figures

Patented June 19, 1973 3,740,163

INVENTORS.
MORRIS A. BARNETT,
ROY L. SCHINNERER,
ALEXANDER SILVER,
LEONARD T. SLADEK,

By Albert J. Miller
ATTORNEY.

Patented June 19, 1973

INVENTORS.
MORRIS A. BARNETT,
ROY L. SCHINNERER,
ALEXANDER SILVER,
LEONARD T. SLADEK,

By Albert J. Miller
ATTORNEY

FLUID BEARING INERTIAL FILTER

BACKGROUND OF THE INVENTION

For many years, air or gas (fluid) bearings have been a natural candidate for high speed turbomachinery design because of the convenience and simplicity of utilizing the process fluid, plate air and/or the ambient atmosphere as a bearing fluid or lubricant. While the process fluid is most readily available as the lubricant, it is often times impure, typically containing various quantities of water, dirt, and/or other contaminants. As a result, fluid bearing applications have been mainly limited to either closed-cycle systems or machines where the cleanliness of the fluid lubricant could be guaranteed. While fluid bearings have significant advantages, such as design simplicity, relaxation of maintenance and servicing requirements, easing of temperature limitations, low noise, longer bearing life and in some cases reduced friction, these bearings are particularly sensitive to contamination in view of the tight clearances and dimensional controls required.

SUMMARY OF THE INVENTION

The present invention is directed to an inertial filter for use in fluid bearing applications, for example, high speed open-cycle air-cycle turbomachines installed on mobile platforms such as aircraft, trucks, tractors and ships. Such equipment includes aircraft air conditioning cooling turbines, turbochargers, gas turbines, motor-driven compressors and the like. The inertial filter draws off fluid from the turbomachinery scroll and supplies such fluid to the fluid bearings which support the rotating parts of the turbomachinery. In one embodiment, the inertial filter may be directed down towards and/or extend into a turbomachinery nozzle.

DESCRIPTION OF THE PREFERRED EMBODIMENTS

Figure 1:
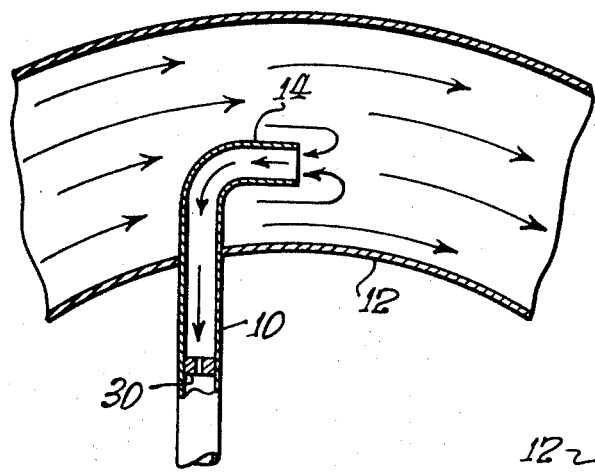
FIG. 1 is a schematic side representation of the inertial filter in a turbomachinery scroll.
Figure 2:
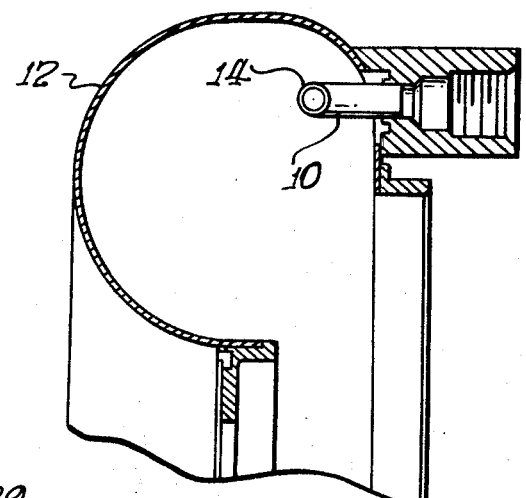
FIG. 2 is an end view partially in section of the inertial filter in a turbomachinery scroll.

As illustrated in FIG. 1, the inertial filter generally comprises a probe 10 extending into the main stream of a turbomachinery scroll 12. The open end portion 14 of the probe 10 is directed downstream such that any flow of air through the open end 14 of the probe 10 is forced to turn approximately 180° before entering the probe. A flow restricting orifice 30 would normally be included in the probe 10 to control the fluid flow. FIG. 2 illustrates an end view of the probe 10 within the turbomachinery scroll 12.

The axis of the downstream extending portion 14 of probe 10 is normally parallel to the stream lines of the main-stream flow in the turbomachinery scroll 12. Thus, any fluid entering the downstream end of the tube 14 must essentially reverse direction before entering the probe and any particles in such fluid would not be able to enter the probe since their momentum would carry them with the primary flow past the probe.

Figure 3:
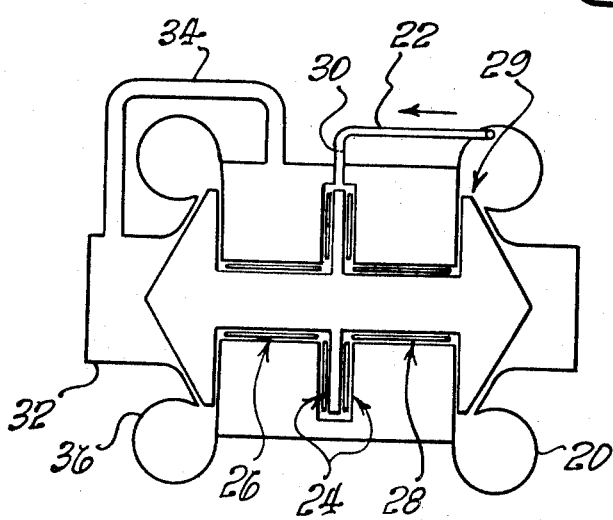
FIG. 3 is a schematic view of the inertial filter in a turbomachinery fluid bearing application.

In the fluid bearing application shown in FIG. 3, the inertial filter 10 taps air from the turbine scroll 20. This air is supplied through a fluid supply line 22 to thrust bearings 24 and journal bearings 26 and 28 which support the rotating assembly 29. Orifice 30 in fluid supply line 22 controls the fluid pressure to the bearings 24, 26, and 28. The fluid proceeds first to the thrust bearings OD, passes through the thrust bearings from OD to ID and then proceeds axially outward through the journal bearings 26 and 28. It is then discharged into the inlet 32 of compressor 36 through discharge line 34. The bearing ambient pressure is thus maintained at compressor inlet pressure.

Figure 4:
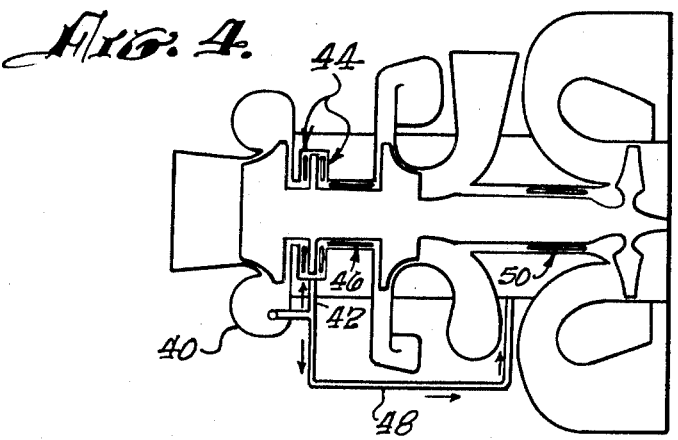
FIG. 4 is a schematic view of the inertial filter in an alternate turbomachinery fluid bearing application.

In the modified fluid bearing application shown in FIG. 4, the cooling or pressurizing fluid is drawn by the inertial filter 10 from the turbine casing or scroll 40 to two bearing cavities. Line 42 supplies fluid to thrust bearings 44 and journal bearing 46 between the turbine and compressor such that the flow is from the thrust bearing OD past the journal bearing and then discharged at the turbine wheel OD. Line 48 supplies fluid to journal bearing 50 between the compressor and the fan. The lower pressure around the bearings causes the flow of air from the higher pressure turbine scroll.

Figure 5:
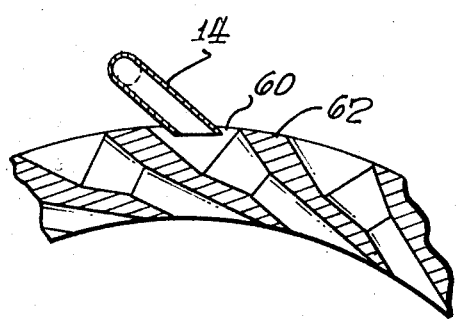
FIG. 5 is a schematic view of the inertial filter directed towards the nozzle inlet of a round hole nozzle in a turbomachinery nozzle ring.
Figure 6:
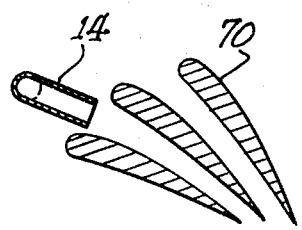
FIG. 6 is a schematic view of the inertial filter directed towards the inlet of a vaned nozzle.

In order to enhance the performance of the inertial filter, the open probe end 14 may be oriented towards the nozzle inlets 60 of nozzle ring 62 as shown in FIG. 5. The probe may extend substantially up to or slightly into the nozzle inlet and have a cambered end generally tangential to the nozzle ring. This provides the greatest fluid velocity past the probe and enhances the filtering of dirt from the air entering the probe. FIG. 6 illustrates the probe end 14 directed towards a vaned nozzle 70. As shown in FIGS. 5 and 6 the probe end 14 would normally be positioned with respect to the nozzle ring so as to be directed at least slightly downward to take advantage of the effect of gravity and thus further enhance the inertial filtering.

If more fluid is required than can be conveniently provided by a single probe, a plurality of probes can be utilized, each probe extending towards a separate nozzle inlet. The fluid from the individual probes may be combined together into a single line or an individual probe may supply fluid to an individual fluid bearing. Likewise, where more than a single row of inlet nozzles are utilized in a nozzle ring, the probe may be centrally positioned between nozzle rows even if the inlet nozzles are staggered around the nozzle ring.

While specific embodiments of the invention have been illustrated and described, it is to be understood that these embodiments are provided by way of example only and that the invention is not to be construed as being limited thereto but only by the proper scope of the following claims.

What we claim is:

1. A turbomachine comprising:
   a rotating assembly;
   a casing positioned around said rotating assembly to direct the flow of a process fluid through said rotating assembly;
   at least one fluid bearing rotatably supporting said rotating assembly within said casing; and means to supply process fluid from said casing to said fluid bearing, said process fluid supply means including an inertial filter comprising a tubular member extending into said casing and having an open end facing away from the direction of process fluid flow in said casing.

2. A turbomachine comprising:

a rotating assembly;

a casing positioned around said rotating assembly to direct the flow of a process fluid through said rotating assembly;

at least one fluid bearing rotatably supporting said rotating assembly within said casing; and means to supply process fluid from said casing to said fluid bearing, said process fluid supply means including an inertial filter comprising a tubular member extending into said casing and having an open end portion extending into said downstream in the direction of process fluid flow in said casing.

3. A turbomachine comprising:

a rotating assembly at least including a turbine rotor:

a casing positioned around said rotating assembly and at least including a turbine scroll having a nozzle to direct the flow of a process fluid through said turbine rotor;

at least one fluid bearing rotatably supporting said rotating assembly within said casing; and means to supply process fluid from said turbine scroll to said fluid bearing, said process fluid supply means including an inertial filter extending into said turbine scroll.

4. A turbomachine comprising:

a rotating assembly at least including a turbine rotor;

a casing positioned around said rotating assembly and at least including a turbine scroll having a nozzle to direct the flow of a process fluid through said turbine rotor;

at least one fluid bearing rotatably supporting said rotating assembly within said casing; and means to supply process fluid from said turbine scroll to said fluid bearing, said process fluid supply means including an inertial filter extending into said turbine scroll, said inertial filter comprising a tubular member having an open end portion extending downstream in the direction of process fluid flow in said turbine scroll.

5. The turbomachine of claim 4 wherein said downstream extending portion of said tubular member is substantially parallel to the flow of process fluid in said turbine scroll.

6. The turbomachine of claim 4 wherein said downstream extending portion of said tubular member extends to the vicinity of the inlet of the turbine nozzle.

7. The turbomachine of claim 4 wherein said downstream extending portion of said tubular member extends substantially to the of the turbine nozzle in the direction of process fluid flow into the turbine nozzle.

8. The turbomachine of claim 6 wherein said turbine nozzle is a substantially round hole nozzle ring.

9. The turbomachine of claim 6 wherein said turbine nozzle is vaned.

10. The turbomachine of claim 4 wherein the downstream extending open end portion of said tubular member opens in a downward direction.

* * * * *